United States Patent
Faust et al.

(10) Patent No.: US 7,470,300 B2
(45) Date of Patent: Dec. 30, 2008

(54) DUCT WALL WATER EXTRACTOR

(75) Inventors: Michael B. Faust, Redondo Beach, CA (US); Millard F. Lockett, Jr., Inglewood, CA (US)

(73) Assignee: Honeywell International Inc., Morristown, NJ (US)

( * ) Notice: Subject to any disclaimer, the term of this patent is extended or adjusted under 35 U.S.C. 154(b) by 562 days.

(21) Appl. No.: 11/297,150

(22) Filed: Dec. 7, 2005

(65) Prior Publication Data
US 2007/0125051 A1 Jun. 7, 2007

(51) Int. Cl.
*B01D 45/12* (2006.01)
(52) U.S. Cl. .............................. 55/394; 55/428; 55/457
(58) Field of Classification Search ................. 55/394, 55/428, 430, 457
See application file for complete search history.

(56) References Cited

U.S. PATENT DOCUMENTS

| | | | |
|---|---|---|---|
| 2,634,822 A | 4/1953 | Coward | |
| 3,710,561 A * | 1/1973 | Garrone | ........................ 55/429 |
| 4,179,273 A | 12/1979 | Montusi | |
| 4,238,210 A * | 12/1980 | Regehr et al. | .................. 55/396 |
| 4,769,050 A | 9/1988 | Shaw et al. | |
| 5,302,301 A | 4/1994 | Stamp et al. | |
| 6,331,195 B1 | 12/2001 | Faust et al. | |
| 6,524,393 B1 | 2/2003 | Afeiche et al. | |
| 6,981,995 B2 * | 1/2006 | Lombana | ...................... 55/452 |
| 7,320,718 B2 * | 1/2008 | Gammelsaeter | .............. 55/394 |

FOREIGN PATENT DOCUMENTS

| | | |
|---|---|---|
| GB | 640 104 A | 7/1950 |
| SU | 639 578 A1 | 12/1978 |
| WO | WO 03/053590 A | 7/2003 |

OTHER PUBLICATIONS

International Search Report dated Aug. 2, 2007.

* cited by examiner

*Primary Examiner*—Robert A Hopkins
(74) *Attorney, Agent, or Firm*—Oral Caglar, Esq.

(57) ABSTRACT

A liquid extractor may comprise a slot in a duct wall and one or more ridges positioned on the interior duct wall surface. A bend in the duct, a swirl device and/or gravity may throw the liquid portion of the flow onto the wall surface. The slot may be oriented longitudinally along the duct. The ridge(s) may intersect the duct and be positioned to direct the liquid on the wall surface to the slot where the water is extracted. An enclosing sump may be positioned on the outside of the duct and over the slot.

24 Claims, 21 Drawing Sheets

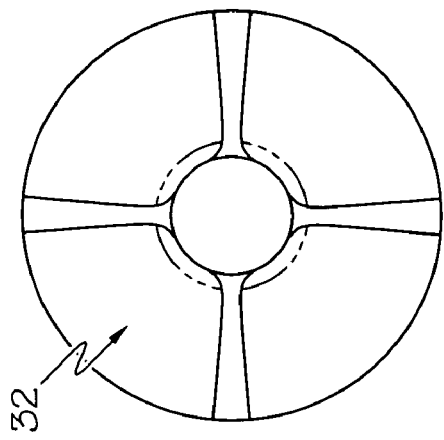
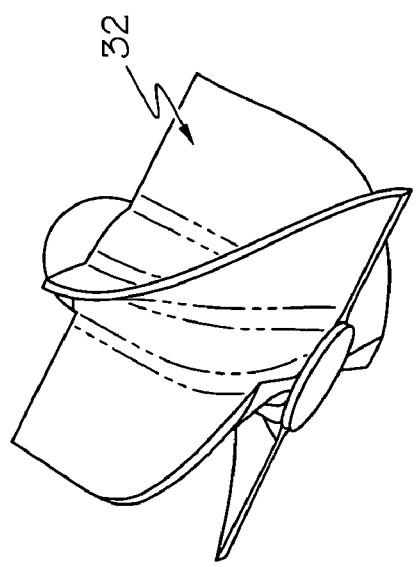
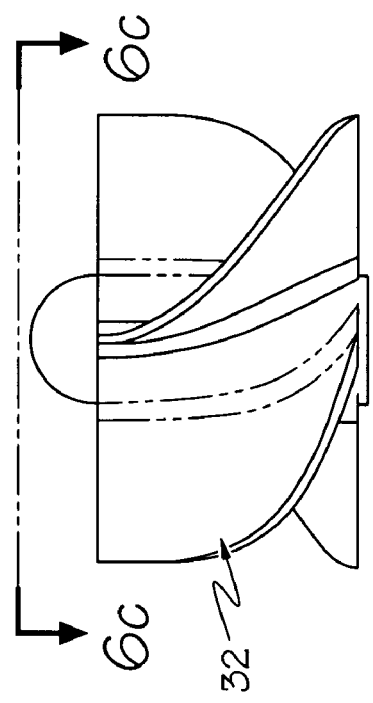
FIG. 6c
FIG. 6b
FIG. 6a

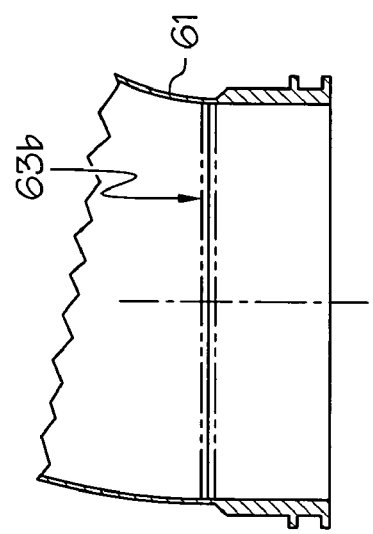
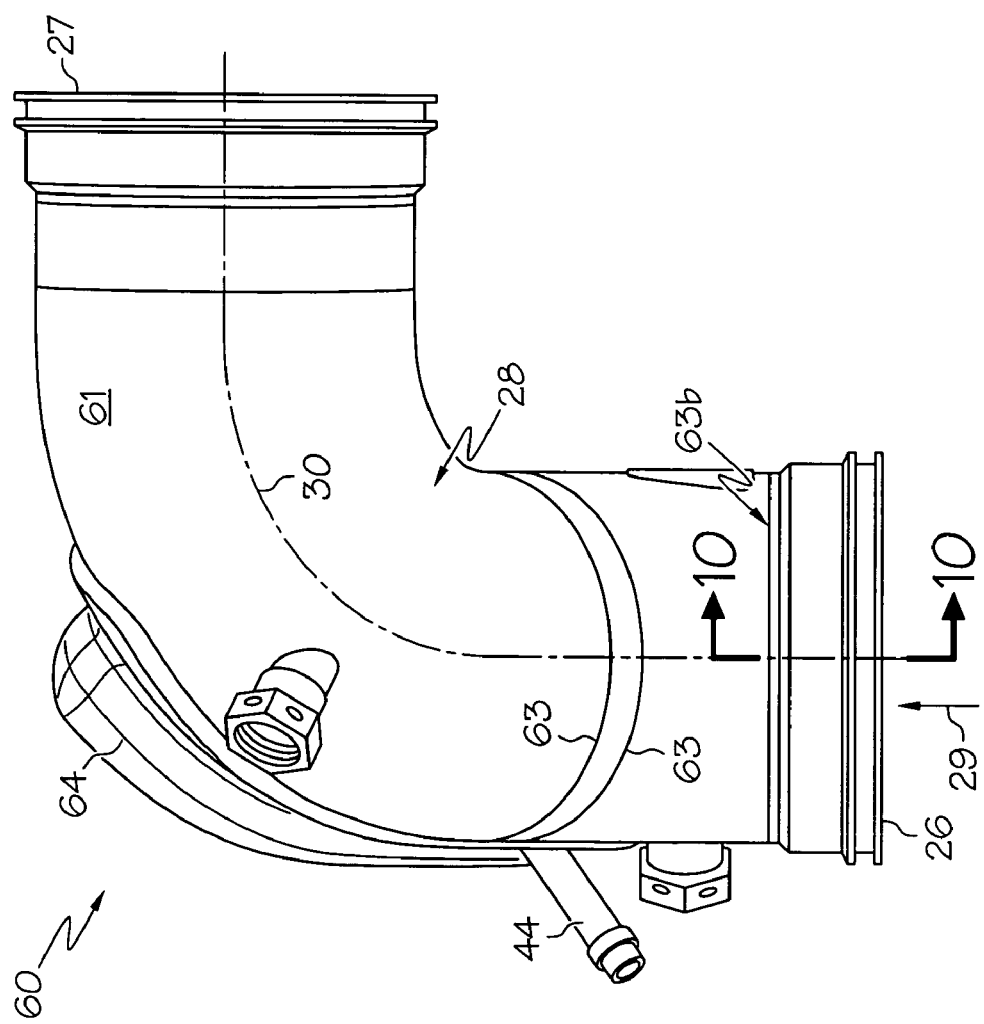
FIG. 10
FIG. 9

DUCT WALL WATER EXTRACTOR

GOVERNMENT INTERESTS

The invention was made with Government support under contract number DAAB07-03-D-B006-0013 awarded by the United States Air Force. The Government has certain rights in this invention.

CROSS-REFERENCE TO RELATED APPLICATION

The present application is related to issued U.S. Pat. No. 6,331,195, issued Dec. 18, 2001, which is incorporated herein by reference.

BACKGROUND OF THE INVENTION

The present invention generally relates to liquid removal apparatus and, more particularly, to duct wall water extractors for aircraft environmental control systems.

Entrained moisture in environmental control systems (ECS) is transported through the conditioned air ducting at various points in the system. If this entrained moisture is not captured and drained away it can cause excessive moisture in the cockpit and/or avionics bay.

A dual scavenging separator is described in U.S. Pat. No. 4,179,273. The disclosed separator comprises a conical feature with an external spiral blade that swirls water droplets and particulates to the enclosing duct wall where they are drained away through slots in the wall into an external sump. A limited number of slots in the cone provide a flow path for the cleaned air. Although the described separator may capture entrained moisture, the tortuous and limited flow path area induces a significant pressure drop penalty for the cleaned air flowing through the device. The pressure drop results in reduced ECS capacity and/or engine efficiency for some aircraft applications.

A liquid separator assembly is described in U.S. Pat. No. 4,769,050. The disclosed assembly comprises two tubes (inlet and outlet), which are crimped, closed, perforated and housed within a surrounding enclosure. The air flow enters one tube, exits through the perforations into the enclosing chamber, and reenters the second tube through its perforations. The water droplets are separated from the air flow in the enclosing chamber and drained away. Unfortunately, this assembly also induces a significant pressure drop penalty caused by its tortuous and limited flow path area.

A liquid/gas separation device that does not require the air flow to go through a reduced airflow path is described in U.S. Pat. No. 5,302,301. In the disclosed separator, the water laden air flow enters an enlarged chamber tangentially, inducing a centrifugal force which drives the water droplets to the chamber wall and subsequently drain to the bottom of the chamber and out through a drain tube. The dried air moves to the center of the chamber where it is directed through a filter element that removes particulates prior to the air being discharged from the device. Unfortunately, the filter element induces a significant pressure drop penalty on the dried air flow. Additionally, this device requires a chamber with a large volume to allow the separation to occur. For some aircraft applications, there is limited space for devices to capture the entrained water due to the close packing of hardware and the large volume chamber may not be suitable.

As can be seen, there is a need for a water separator device that does not require a volume expansion or settling chamber to separate the water from the air stream. Because the amount of ECS airflow is critical, a water extraction device that does not excessively restrict the airflow is needed. Further, a water extractor that has a smaller and more compact design is needed.

SUMMARY OF THE INVENTION

In one aspect of the present invention, an apparatus for extracting a liquid portion from a flow comprises a duct adapted to receive the flow; and at least one slot positioned longitudinally along the duct.

In another aspect of the present invention, an apparatus for extracting a liquid portion from a flow comprises a duct adapted to receive the flow, the duct having a slot; a sump positioned longitudinally along the duct and in flow communication with the slot, the sump adapted to receive the liquid portion; and at least one ridge positioned on an inner surface of the duct and intersecting the slot.

In still another aspect of the present invention, an apparatus comprises a duct for receiving a liquid/gas mixture, the duct having a bend; a slot positioned on an outer side of the bend and positioned parallel to a duct axis of the duct; at least one ridge intersecting the slot; and a sump in contact with the duct and designed to enclose the slot, the sump adapted to receive a liquid portion of the liquid/gas mixture.

These and other features, aspects and advantages of the present invention will become better understood with reference to the following drawings, description and claims.

BRIEF DESCRIPTION OF THE DRAWINGS

FIG. 6a is a perspective view of a swirl device according to one embodiment of the present invention;

FIG. 6b is a side view of the swirl device of FIG. 6a;

FIG. 6c is a view through line 6c-6c of FIG. 6b;

FIG. 9 is a perspective view of a liquid extractor according to one embodiment of the present invention;

FIG. 10 is a view through line 10-10 of FIG. 9;

DETAILED DESCRIPTION OF THE INVENTION

The following detailed description is of the best currently contemplated modes of carrying out the invention. The description is not to be taken in a limiting sense, but is made merely for the purpose of illustrating the general principles of the invention, since the scope of the invention is best defined by the appended claims.

Broadly, the present invention provides liquid separation devices and methods for producing the same. Embodiments of the present invention may find beneficial use in many industries including aerospace, automotive, and electricity generation. Embodiments of the present invention may be beneficial in applications including aircraft environmental control systems (ECS) and heating ventilation and air-conditioning (HVAC) duct systems. Embodiments of the present invention may be useful in any liquid/gas separation application.

In one embodiment, the present invention may comprise a water extractor device having two primary features for removing entrained water from the interior wall of an ECS duct. The first primary feature may comprise a slot in the duct wall that is oriented longitudinally along the duct. An enclosing sump may be positioned on the outside of the duct and over the slot. Unlike the prior art, the longitudinal orientation may allow the extractor to fit in the aircraft better than a more traditional circumferential slot and housing or an extractor having a large volume chamber. Unlike the prior art that positions the extractor in a straight section of duct, the longitudinal slot of some embodiments of the present invention may be located on the outside of a bend in the duct, where inertial forces direct the entrained water. An upstream swirl device may or may not be used in conjunction with the slot.

The second primary feature may comprise one or more continuous ridges positioned on the interior duct wall surface. The ridges may be positioned to direct water on the duct wall to the slot where the water is extracted. The ridges may be single or multiple and may have gaps to direct the water to specific locations. Unlike the complicated flow path of the prior art, the water may flow along the ridges to the slot using Coanda effect on the downstream side of the ridges. Unlike the tortuous and limited flow path area of the prior art, the low profile ridges may not induce a significant pressure drop penalty.

Figure 1:
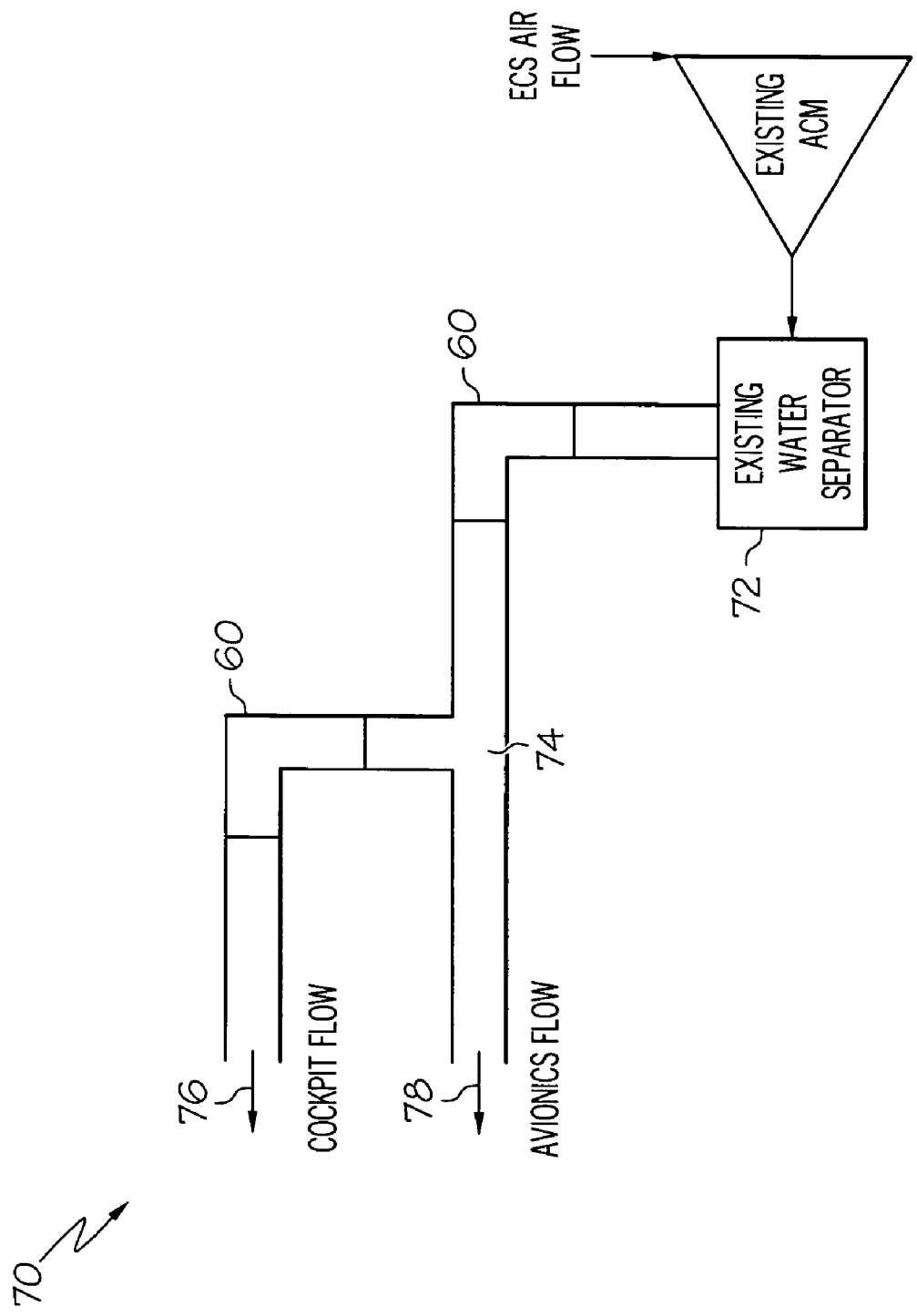
FIG. 1 is a schematic diagram of an environmental control system according to one embodiment of the present invention.

In one embodiment, the present invention may provide a liquid extractor 60 for an environmental control system 70, as depicted in FIG. 1. The liquid extractor 60 may be positioned downstream from an existing ECS water separator 72. The liquid extractor 60 may be in flow communication with an ECS duct system 74. The liquid extractor 60 may be positioned upstream from a cockpit flow 76 and/or an avionics flow 78.

Figure 2:
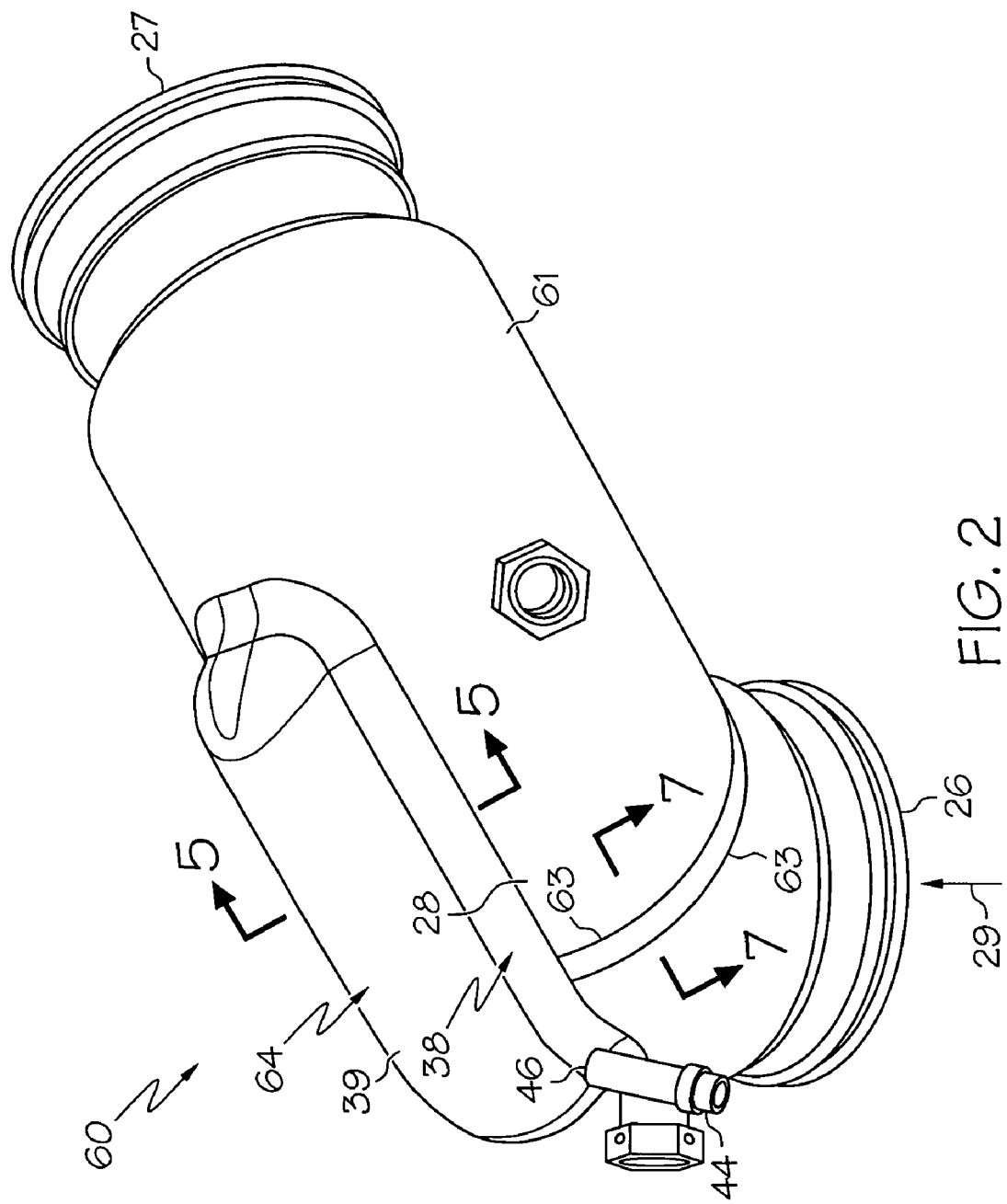
FIG. 2 is a perspective view of a liquid extractor according to one embodiment of the present invention.
Figure 3:
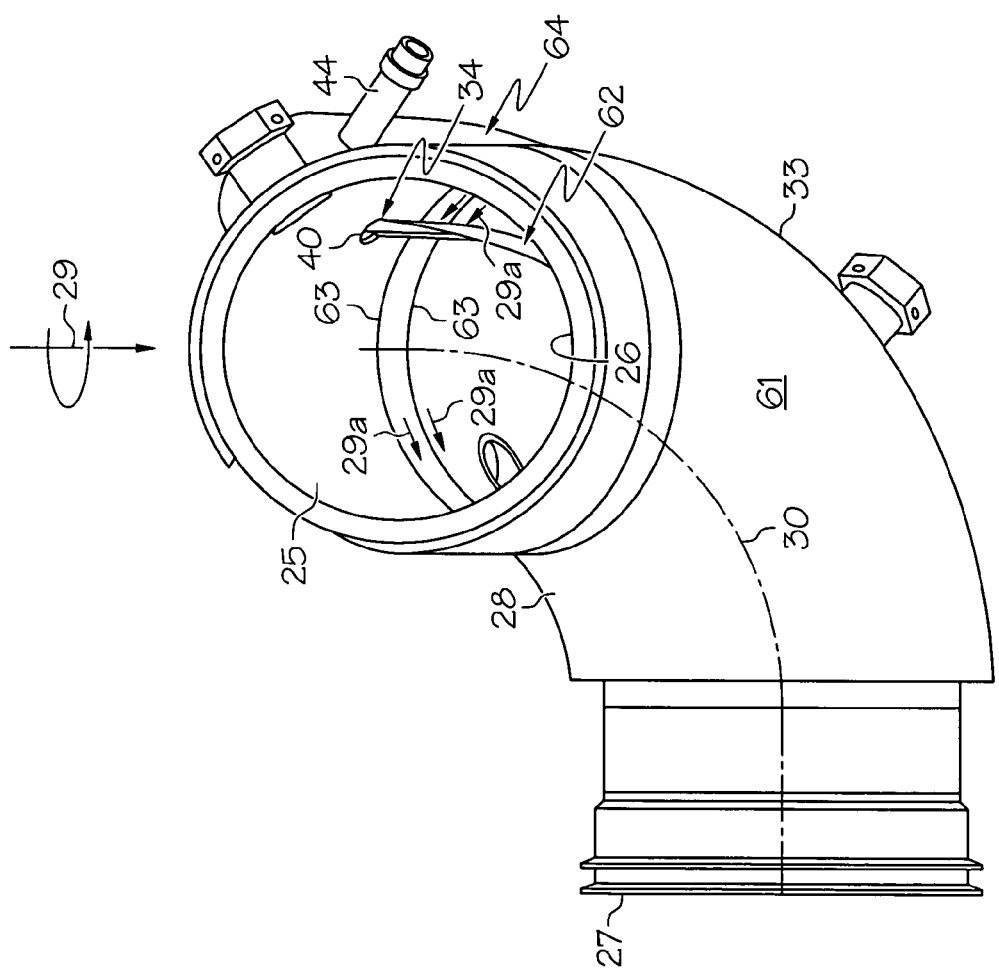
FIG. 3 is another perspective view where the extractor of FIG. 2 has been rotated to view it from the inlet.
Figure 4:
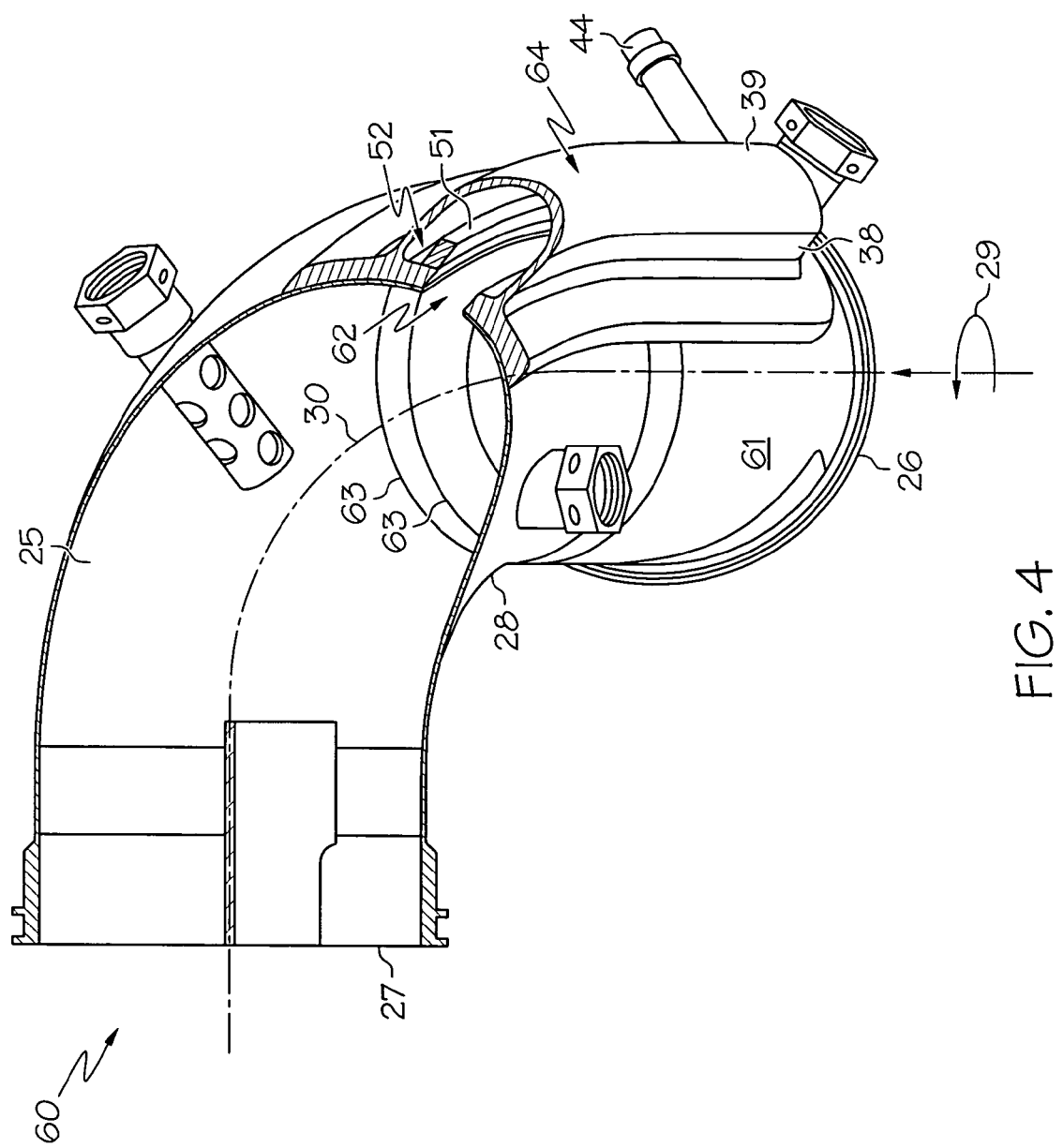
FIG. 4 is a cut-away rotated view of FIG. 2.

The liquid extractor 60 according to an embodiment of the present invention is depicted in FIGS. 2-4. The liquid extractor 60 may comprise a duct 61, at least one slot 62 (see FIG. 3), at least one ridge 63 and a sump 64. The duct 61 may be designed to receive a flow 29 comprising a liquid/gas mixture. The slot 62 may be positioned longitudinally along the duct 61. The ridge 63 may be positioned on an inner surface 25 of the duct 61 and designed to direct a liquid portion 29a (see FIG. 3) of the flow 29 towards the slot 62. The sump 64 may be positioned radially outward from the slot 62 and designed to receive the liquid portion 29a. Although the embodiments of the liquid extractor 60 depicted in the figures include at least one ridge 63, it is contemplated that the invention may also lack the ridges 63.

The duct 61, such as, but not limited to, an ECS duct, may comprise a tube shaped structure having an inlet 26 and an outlet 27. The dimensions of the duct 61 may vary and may depend on the application. For a non-limiting example, the duct 61 may have a length of about 10.0 inches and a diameter of about 3.0 inches for some ECS applcations. The duct 61 may comprise various materials including, but not limited to, sheet metal and plastic. For some applications, the duct 61 may comprise aluminum. The inlet 26 may be designed to receive the flow 29. The flow 29 may comprise various liquid/gas mixtures, such as a water/air mixture or an oil/air mixture.

The duct 61 may include a bend 28. As the flow 29 passes through the bend 28, inertial forces may direct the liquid portion 29a (see FIG. 3) of the flow 29 to be thrown toward an outer side 33 of the bend 28 and onto the inner surface 25 of the duct 61. For some applications, the duct 61 may comprise a straight cylindrical member having no bends (not shown) and the duct 61 may be positioned such that gravity may direct the liquid portion 29a of the flow 29 towards the inner surface 25 of the duct 61.

The duct 61 may include a swirl device 32 (see FIGS. 6a-6c), such as a static swirl vane. The swirl device 32 may be positioned upstream from the slot 62. The swirl device 32 may impart a centrifugal swirl on the flow 29. In FIGS. 3 and 4 the swirl is in a counter-clockwise direction looking downstream. The centrifugal swirl may cause the heavier liquid portion 29a (e.g. entrained water) of the flow 29 to be separated from a lighter portion (not shown) (e.g. air) of the flow 29. The centrifugal swirl may throw the entrained water downstream and outward towards the inner surface 25 of the duct 61. Embodiments of the liquid extractor 60 may comprise the bend 28, the swirl device 31, both the bend 28 and the swirl device 31, or neither the bend 28 nor the swirl device 31 to direct the liquid portion 29a of the flow 29 towards the inner surface 25 of the duct 61.

The liquid extractor 60 may include at least one slot 62, as depicted in FIG. 3. The slot 62 may allow for capture of the liquid portion 29a of the flow 29, which may be traveling on the inner surface 25 of the duct 61. The slot 62 may comprise a slit through the wall of the duct 61 and may be oriented longitudinally along the duct 61. For some applications, the slot 62 may be positioned lengthwise along the duct 61 and parallel to a duct axis 30, as depicted in FIG. 3. For some applications, the slot 62 may include a keyhole 34 (see FIG. 3) positioned at an upstream end 40 and/or a downstream end 41 (see FIG. 18) of the slot 62 to reduce the stress gradient of the duct 61 resulting from the flow 29 and associated pressure.

The dimensions of the slot 62 may vary with application. Computational fluid dynamics analysis (CFD) may be useful for determining the dimensions of the slot 62 for some applications. By way of non-limiting example, some applications may have a slot 62 comprising a slot width 31 (see FIG. 5a) of less than about 0.25 inch. The slot width 31 may be, but not limited to, approximately 0.15 inch for some aircraft applications. For some applications, turbulence within the sump 64 may be proportional to the slot width 31. In other words, the larger the slot width 31, the greater the turbulence within the sump 64. Excessive sump turbulence may result in the liquid portion 29*a* reentering the duct 61 from the sump 64 and a reduction in extractor efficiency. The length of the slot 62 may vary and may depend on factors including the diameter of the duct 61. For some applications, the length of the slot 62 may be about equal to or greater than the diameter of the duct 61. For example, a duct 61 having a 3.0-inch diameter may include a slot 62 having a length between 4 and 5 inches.

The slot 62 may be positioned on the outer side 33 of the bend 28, for applications including the bend 28. The slot 62 may be positioned downstream from the swirl device 32, for applications including the swirl device 32. For some applications, the duct 61 may comprise more than one slot 62 and the slots 62 may be positioned axially in-line with respect to the duct axis 30. Alternatively, the slots 62 may be positioned parallel to each other about the circumference of the duct 61. As a third alternative, the slots 62 may be positioned parallel and axially staggered. The number and positioning of the slots 62 may vary with application and may depend on factors including the dimension of the duct 61 and the composition of the flow 29.

Figure 7:
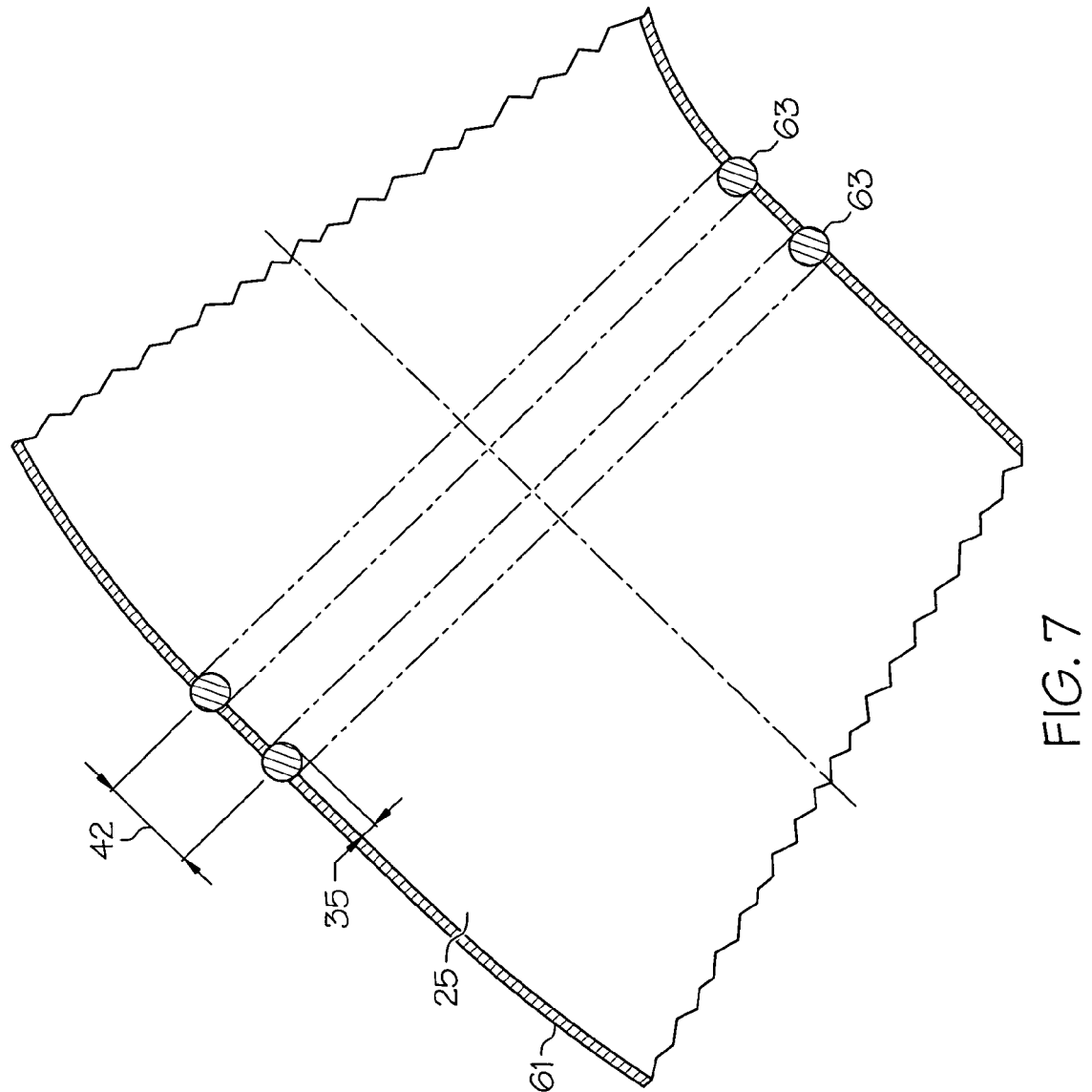
FIG. 7 is a cross-sectional view through line 7-7 of FIG. 2.

The liquid extractor 60 may include at least one ridge 63, as depicted in FIG. 7. The ridge 63 may comprise a ridge-shaped structure that extends radially inward from the inner surface 25 of the duct 61. A radial height 35 of the ridge 63 may be between about 0.050 inches and about 0.100 inches. The radial height 35 may be such that the ridge 63 produces minimal resistance to the flow 29 in the duct 61 and such that the ridge 63 directs the liquid portion 29*a* of the flow 29 towards the slot 62. The ridge 63 may be formed by various methods. For example, weld penetration techniques may be used to provide the ridge 63. Alternatively, the ridge 63 may comprise a strip of metal attached to the inner surface 25 of the duct 61. The method of providing the ridge 63 may depend on manufacturing preference.

Some embodiments of the liquid extractor 60 may comprise two or more ridges 63 parallel to one another, forming a group of ridges 63. Ridges 63 within a group may be spaced axially from one another by a minimum axial distance 42 of about 0.35 inches, as depicted in FIG. 7. Some embodiments of the present invention may comprise more than one group of ridges 63. For example, the liquid extractor 60 may comprise one group of ridges 63 towards the upstream end 40 of the slot 62 and another group of ridges 63 towards the downstream end 41 of the slot 62. For some embodiments, for example when the duct 61 has a bend 28, the groups of ridges 63 may not be parallel to one another. The number and positioning of the ridge(s) 63 may vary with application and may depend on factors including the dimensions of duct 61 and the length of the slot 62. For some ECS applications, the liquid extractor 60 may comprise less than about ten ridges.

Figure 8A:
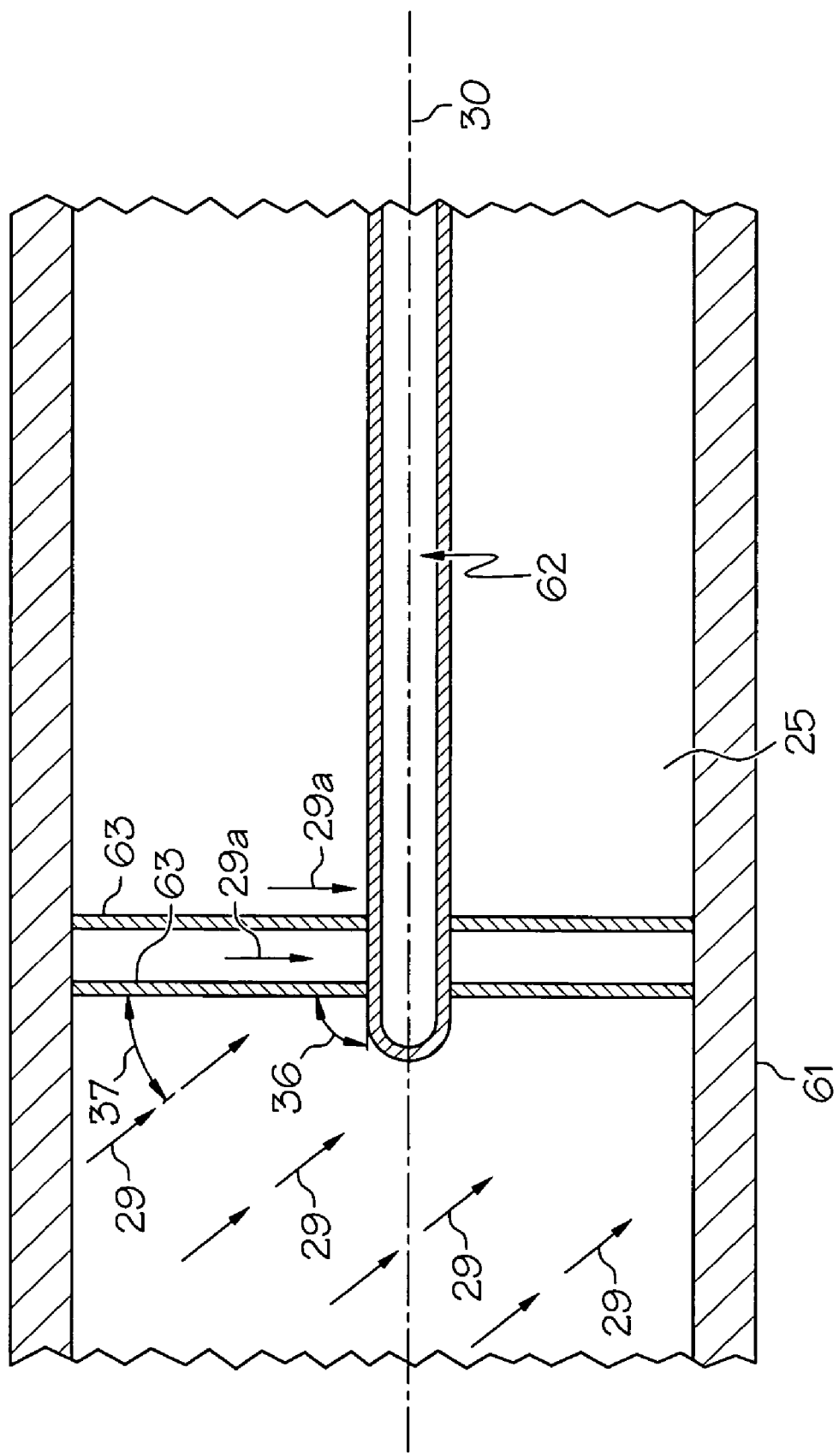
FIG. 8a is a cross-sectional view of a portion of a duct according to one embodiment of the present invention.
Figure 8B:
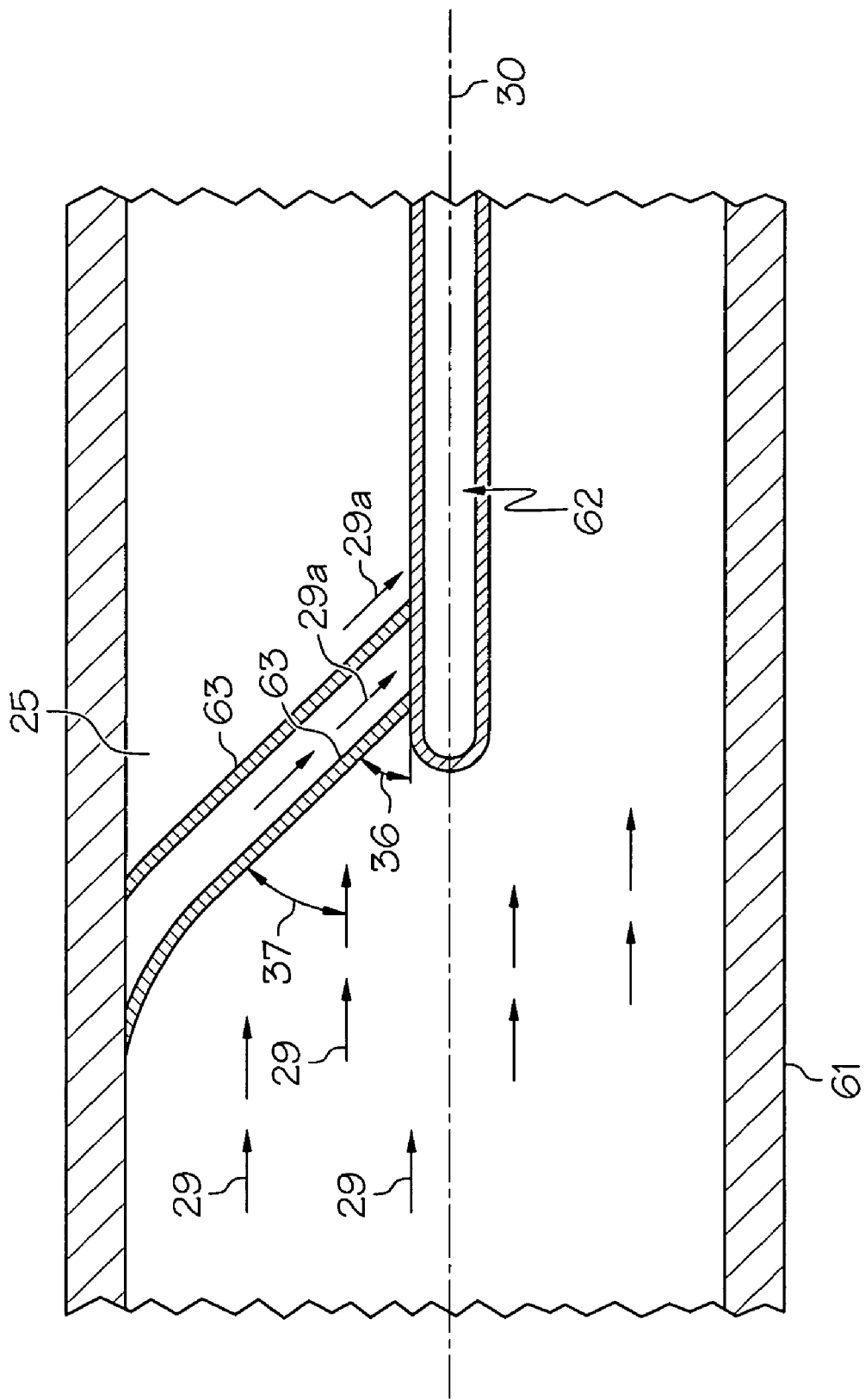
FIG. 8b is a cross-sectional view of a portion of a duct according to another embodiment of the present invention.
Figure 11:
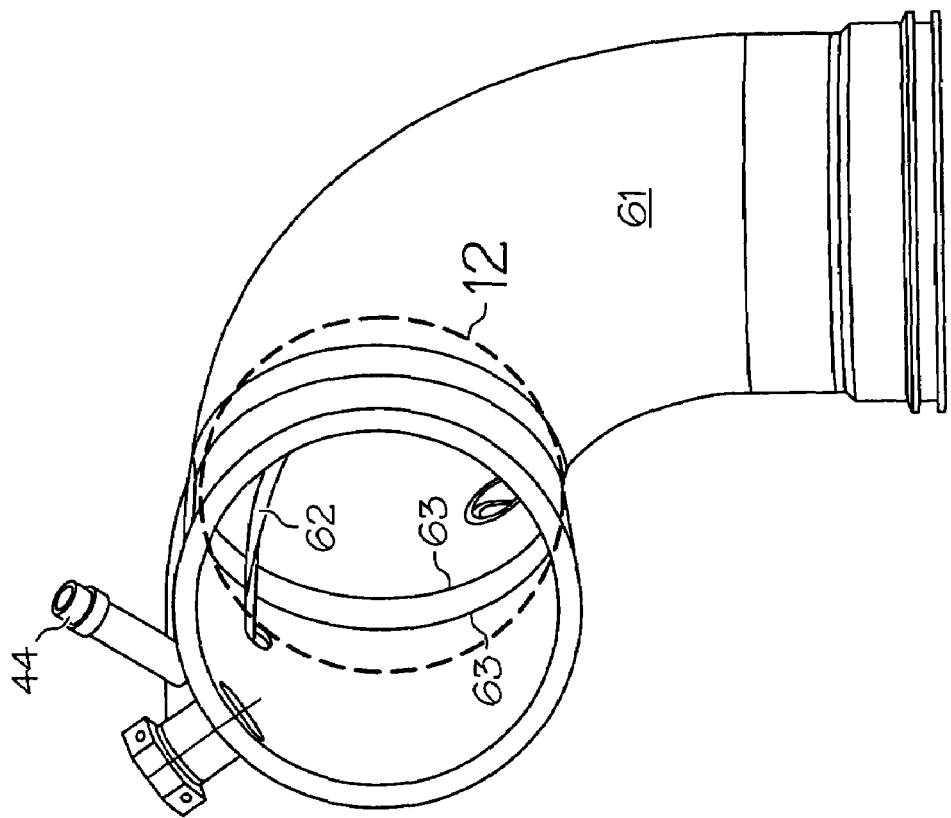
FIG. 11 is a perspective view of a liquid extractor according to one embodiment of the present invention.

At least one ridge 63 may intersect the slot 62, as depicted in FIGS. 3 and 11. For some embodiments, the ridge 63 may intersect the slot 62 at a position at least about 2.0 inches upstream from the downstream end 41 of the slot 62. The ridge 63 may intersect the slot 62 at an angle (ridge/slot angle 36) less than or equal to about 90 degrees, as depicted in FIGS. 8*a* and 8*b*. The ridge 63 may run circumferentially along the inner surface 25 such that the ridge 63 may be about perpendicular to the duct axis 30, as depicted in FIG. 8*a*. Alternatively, the ridge 63 may have a swirl orientation relative to the duct axis 30, as depicted in FIG. 8*b*. The ridge 63 may direct the liquid portion 29*a* to the slot 62 where it may be captured. Some embodiments may further include at least one non-slot-intersecting ridge (upstream ridge 63*b*)

upstream from the slot 62, as depicted in FIGS. 9 and 10. The upstream ridge 63*b* may concentrate the liquid potion 29*a* of the flow 29.

Figure 12:
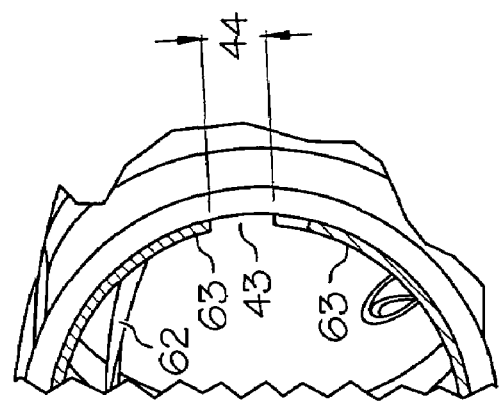
FIG. 12 is a close-up view of FIG. 11.

A gap 43, as depicted in FIG. 12, may be incorporated into the ridge 63 and/or 63*b* at a strategic position, which allows the flow 29 to redirect the liquid portion 29*a* away from the ridge 63, 63*b* to another ridge(s) 63, 63*b* or the slot 62.

The ridge 63, 63*b* may be angled with respect to the flow 29. The ridge 63, 63*b* and the surface of the flow 29 may form an angle (ridge/flow angle 37) of between about 10° and about 70°, as depicted in FIGS. 8*a* and 8*b*. For some applications, the ridge/flow angle 37 may be less than about 60°. For applications including more than one ridge 63, 63*b*, the ridge/flow angle 37 may or may not be the same for each ridge 63, 63*b*. The ridge/flow angle 37 may vary with application and may depend on factors including the diameter of the duct 61 and the velocity of the flow 29.

Due to the low radial height 35 (e.g. about, but not limited to, 0.060 inches for some ECS applications), the ridge 63, 63*b* may produce minimal resistance to air flow (flow 29) in the duct 61. The ridge 63, 63*b* may capture the liquid portion 29*a* (e.g. water) on the downstream side of the ridge 63, 63*b* due to the low pressure zone created there, and the liquid portion 29*a* may run along the ridge 63, 63*b* due to the relative angle of the air flow (ridge/flow angle 37). The liquid portion 29*a* running along the ridge 63 may pass through the slot 62 and enter the sump 64.

Figure 5A:
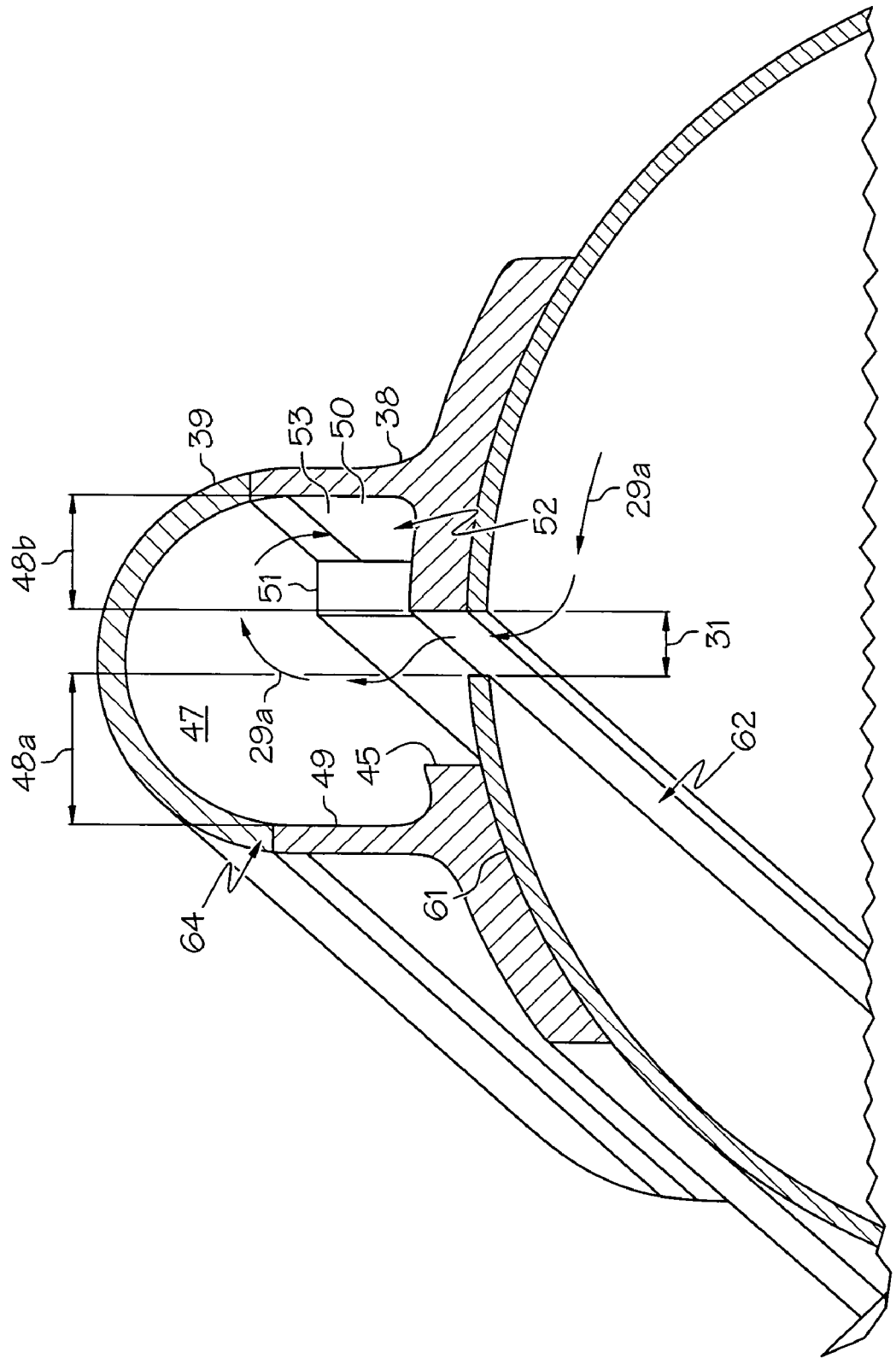
FIG. 5a is a cross-sectional view through line 5-5 of FIG. 2.
Figure 5B:
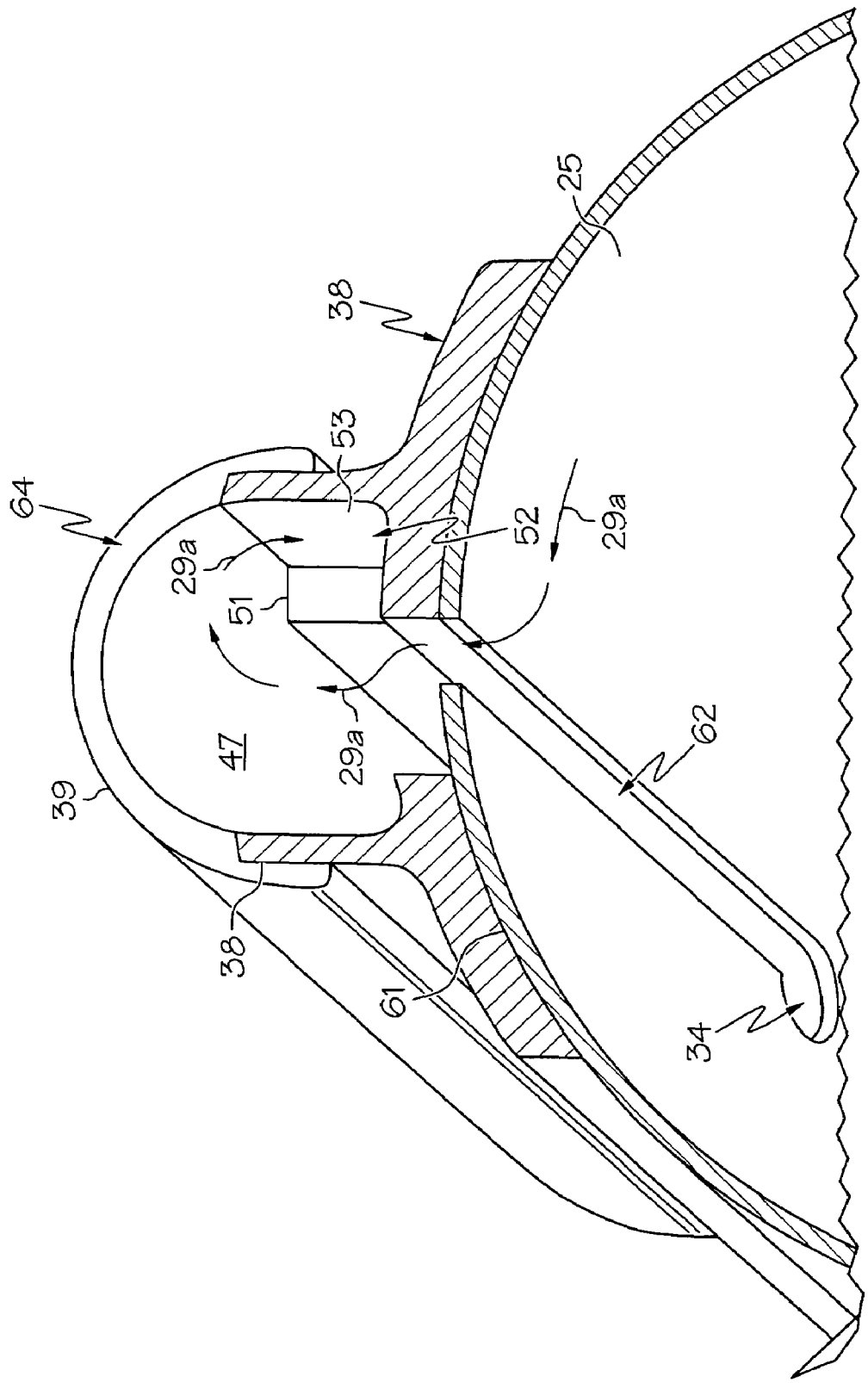
FIG. 5b is a cross-sectional view through line 5-5 according to another embodiment of the present invention.

The sump 64 of the liquid extractor 60 may comprise a structure having a sump cavity 47 adapted to receive the liquid portion 29*a* of the flow 29, as depicted in FIGS. 5*a* and 5*b*. The sump 64 may comprise a structure that encloses the slot 62 such that the liquid portion 29*a* passing through the slot 62 from the duct 61 may enter the sump cavity 47. The sump 64 may be positioned radially outward from the slot 62 and attached to the duct 61. The sump 64 may comprise a body member 38 and a cover member 39, as depicted in FIGS. 2 and 4.

Figure 13:
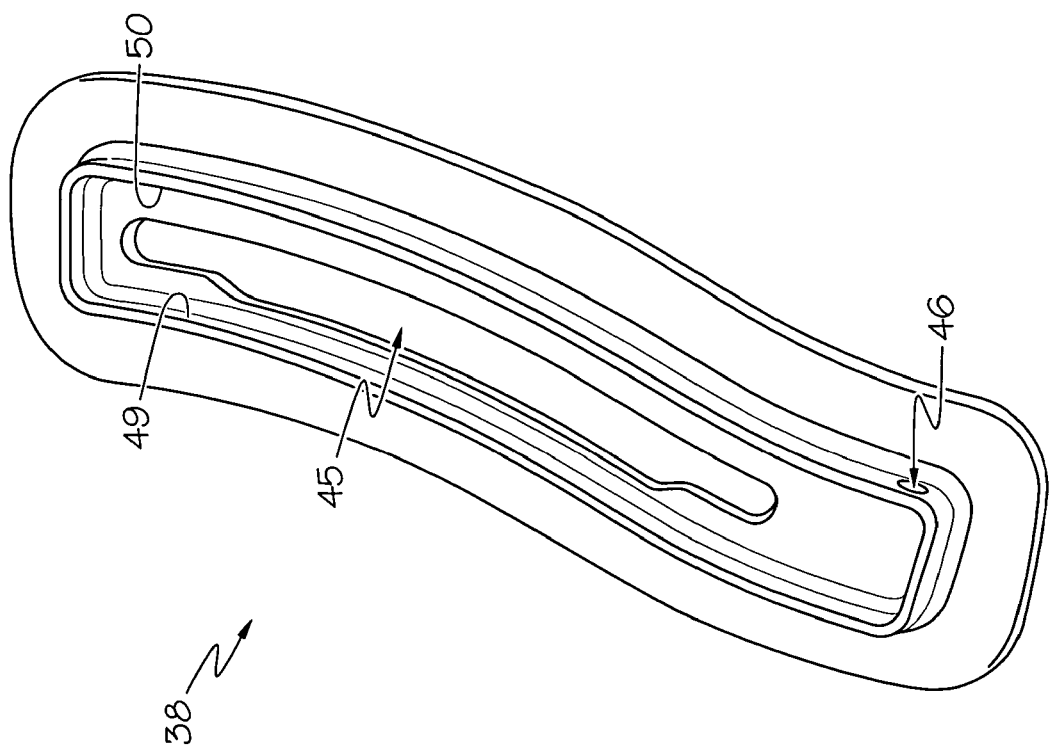
FIG. 13 is a perspective view of a sump body according to one embodiment of the present invention.
Figure 14:
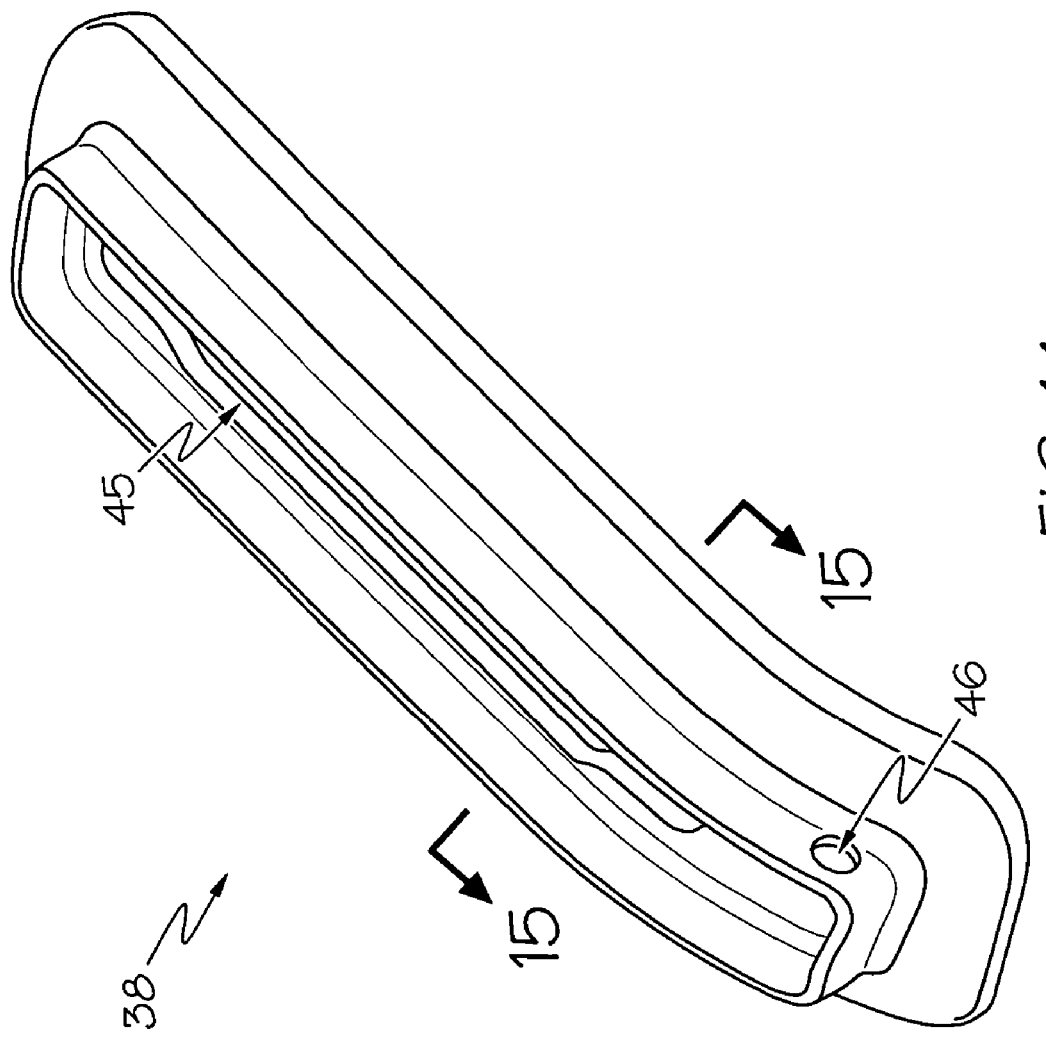
FIG. 14 is a rotated view of FIG. 13.
Figure 15:
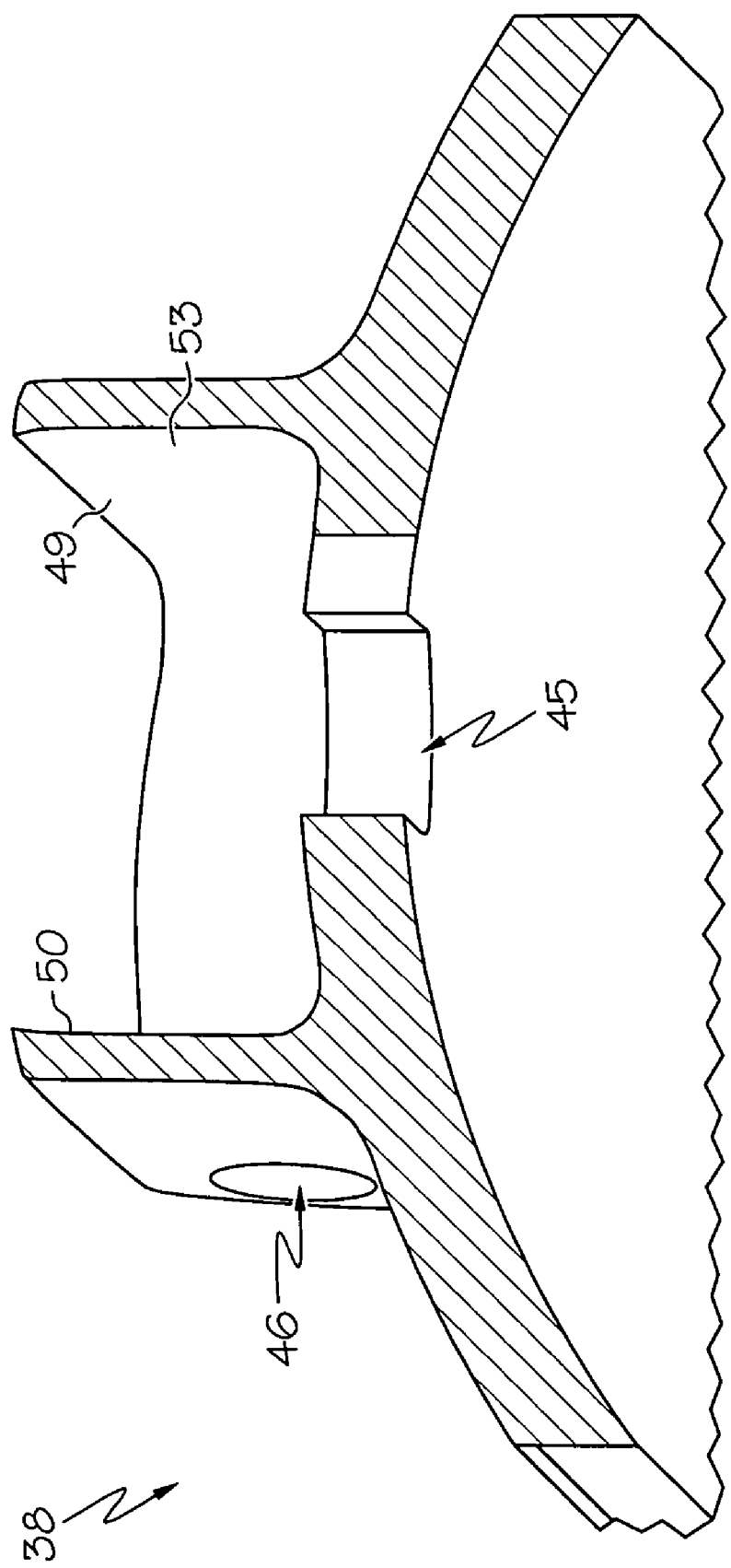
FIG. 15 is a cross-sectional view through line 15-15 of FIG. 14.
Figure 16:
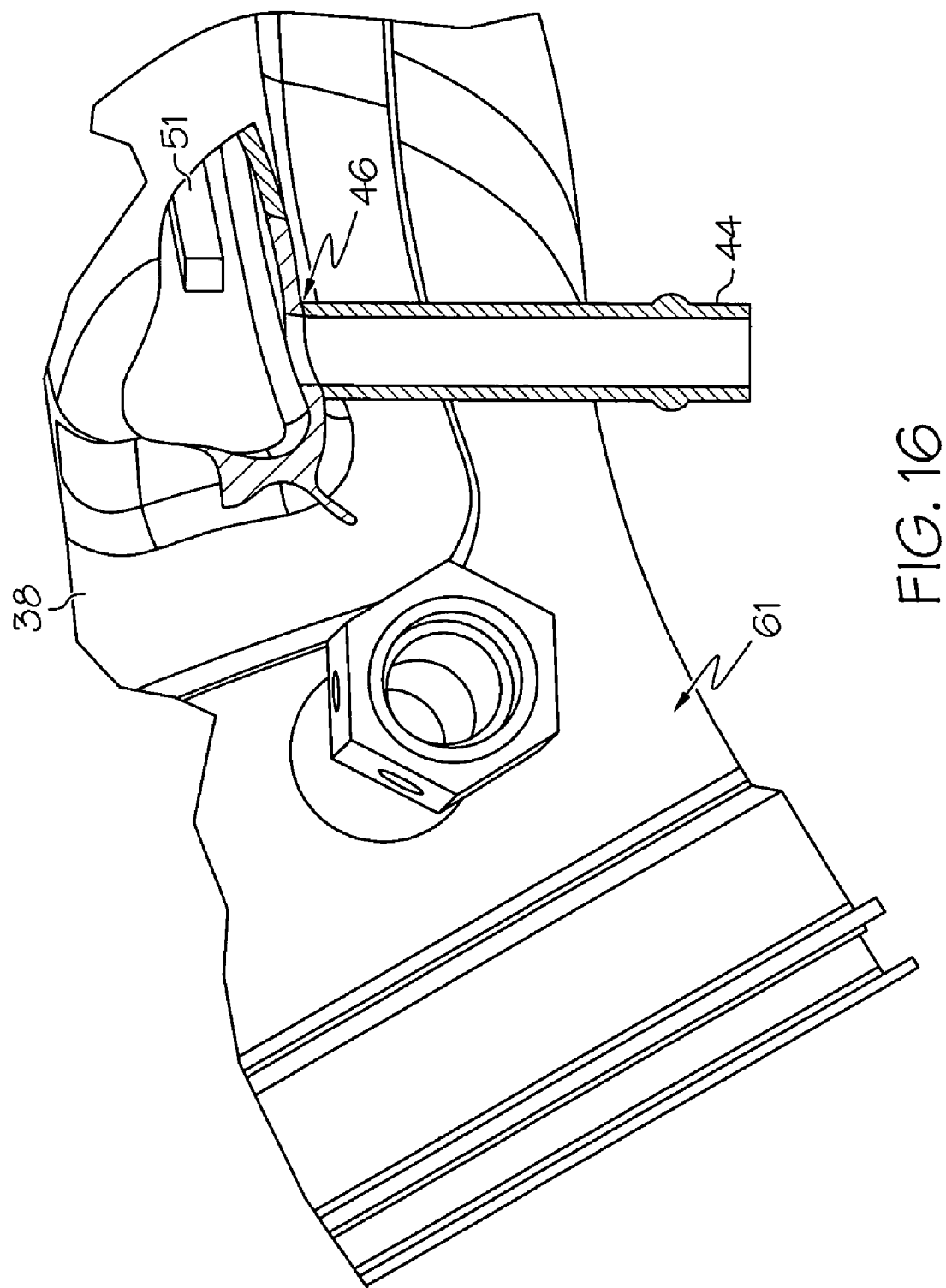
FIG. 16 is a cut-away view of a portion of a liquid extractor according to one embodiment of the present invention.
Figure 17:
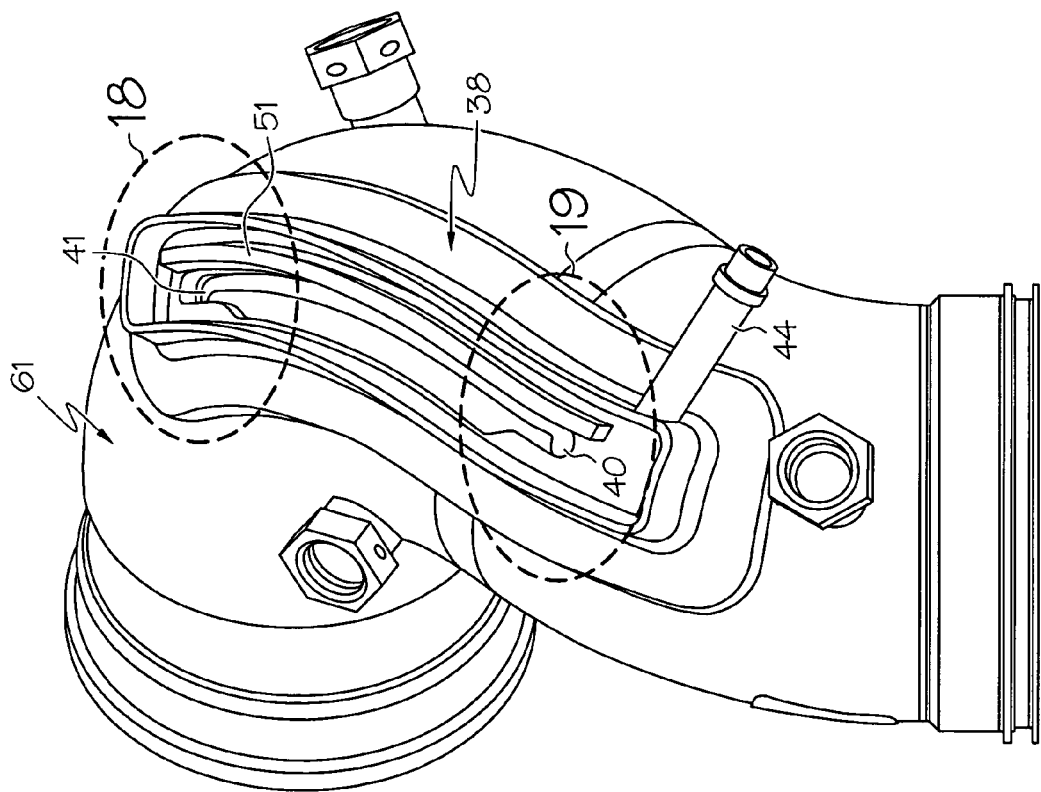
FIG. 17 is a perspective view of a liquid extractor according to one embodiment of the present invention.
Figure 19:
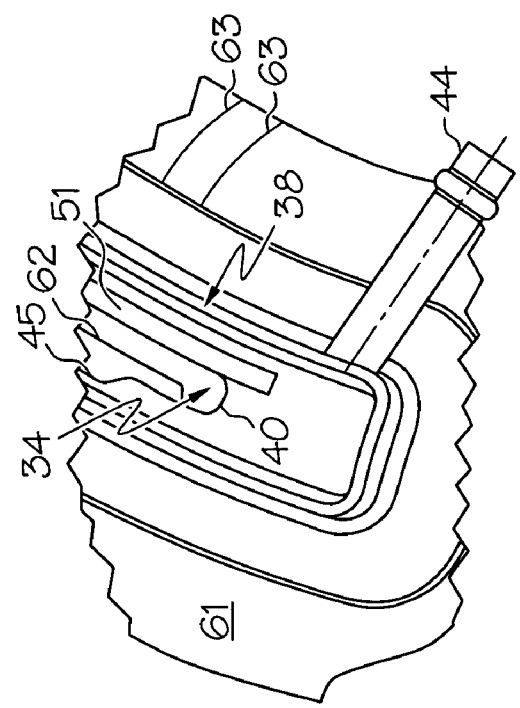
FIG. 19 is a close-up view of section 19 of FIG. 17.
Figure 18:
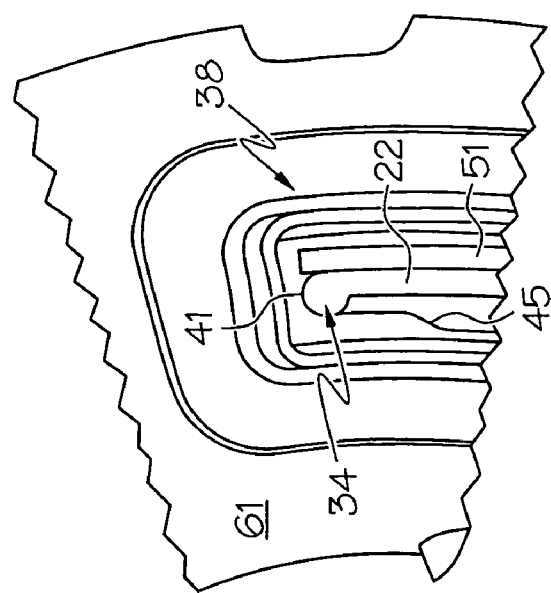
FIG. 18 is a close-up view of section 18 of FIG. 17.

The body member 38, as depicted in FIGS. 13-15, may comprise a structure having a drainage orifice 46 and an opening 45. The drainage orifice 46 may be in flow communication with a drain boss 44, as depicted in FIG. 16. During assembly, the opening 45 may be positioned over the slot 62, as depicted in FIGS. 17-19. The opening 45 may be in flow communication with the slot 62 such that the liquid portion 29*a* the passes from the slot 62, through the opening 45 and into the sump cavity 47, as depicted in FIG. 5*a* and 5*b*.

The dimensions of the opening 45 may vary with application and may depend on the dimensions of the slot 62. A first edge distance 48*a* measured from the slot 62 to a first inner wall 49 of the body member 38 may be, but not limited to, between about 0.20 inches and about 0.35 inches, as depicted in FIG. 5*a*. For some ECS applications, the first edge distance 48*a* may be approximately 0.25 inches. A second edge distance 48*b* measured from the slot 62 to a second inner wall 50 of the body member 38 may be, but not limited to, between about 0.25 inches and about 0.50 inches, as depicted in FIG. 5*a*. For some ECS applications, the second edge distance 48*b* may be approximately 0.38 inches. The second edge distance 48*b* may be large enough that the liquid portion 29*a* does not reenter the duct 61, but instead exits the sump cavity 47 through the drainage orifice 46.

The body member 38, as depicted in FIGS. 5*a* and 5*b* may include a retaining wall 51. The retaining wall 51 may comprise a structure positioned within the sump cavity 47 and along the length of the slot 62. A gutter 52 may be created between the retaining wall 51 and an interior surface 53 of the sump 64. The gutter 52 may capture, retain, and direct the liquid portion 29a towards the drainage orifice 46. For some applications, the retaining wall 51 may allow the second edge distance 48b to be reduced. For example, a second edge distance of about 0.38 inch may be reduced to approx 0.28 inch when the retaining wall 51 is included.

Figure 21:
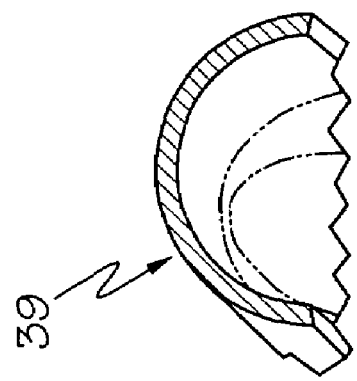
FIG. 21 is a cross-sectional view through line 21-21 of FIG. 20.
Figure 20:
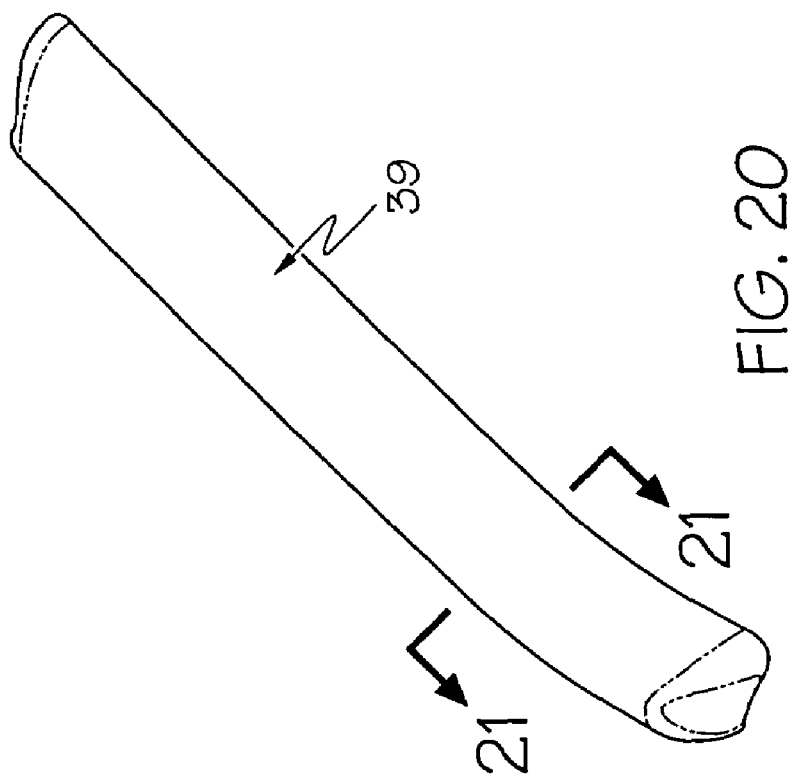
FIG. 20 is a perspective view of a sump cover according to one embodiment of the present invention.
Figure 23:
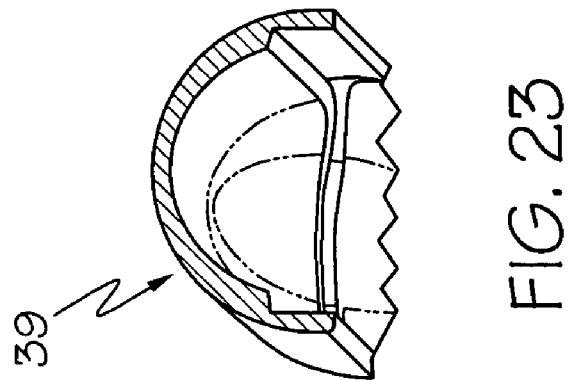
FIG. 23 is a cross-sectional view through line 23-23 of FIG. 22.
Figure 22:
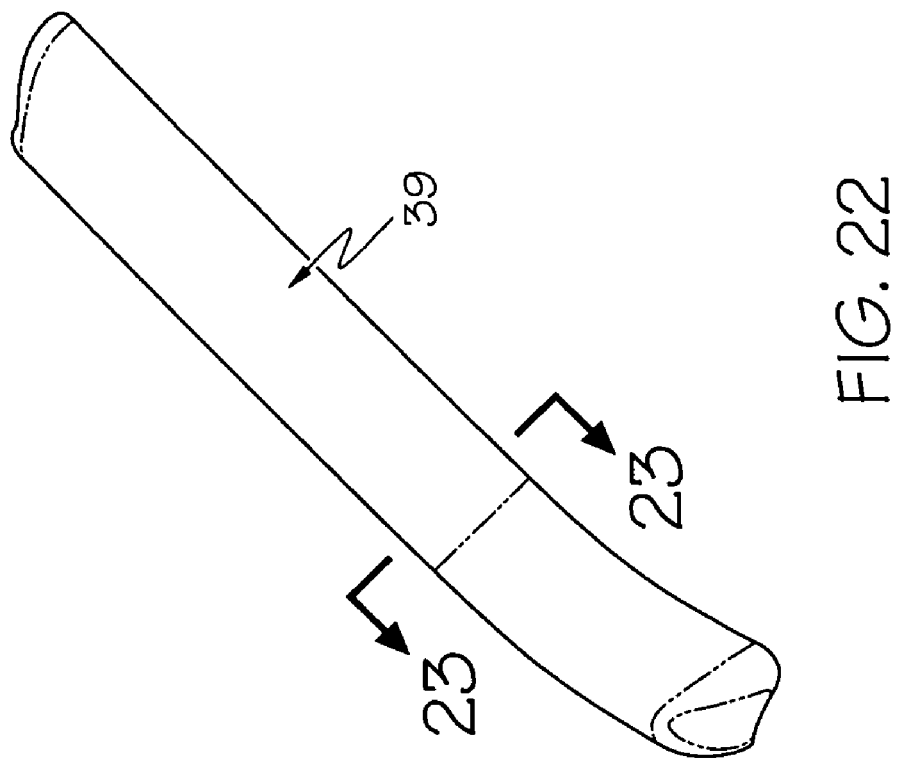
FIG. 22 is a perspective view of a sump cover according to another embodiment of the present invention.

The cover member 39, as depicted in FIGS. 20-23, may comprise a structure adapted to attach to the body member 38. In some embodiments, the cover member 39 may be designed to be welded to the body member 38, as depicted in FIGS. 5a, 20 and 21. In an alternate embodiment, the cover member 39 may be designed to be brazed to the body member 38, as depicted in FIGS. 5b, 22 and 23. In another alternate embodiment, the cover member 39 may be integral to the body member 38. The design of the cover member 39 and the body member 38 may depend on manufacturing preference.

Figure 24:
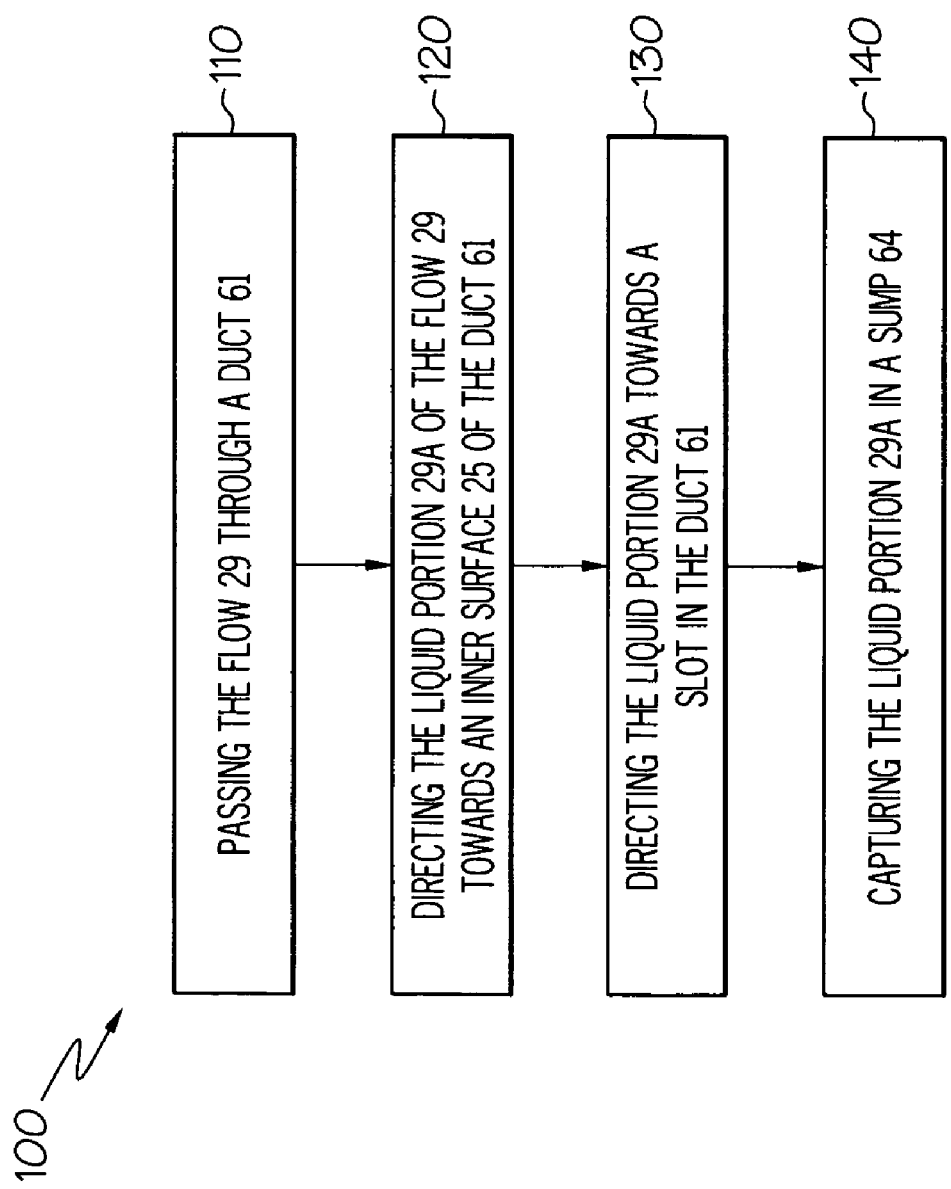
FIG. 24 is a flow chart of a method of extracting a liquid portion from a flow according to an embodiment of the present invention.

A method 100 of extracting a liquid portion from a flow is depicted in FIG. 24. The method 100 may comprise a step 110 of passing the flow 29 through a duct 61, a step 120 of directing the liquid portion 29a of the flow 29 towards an inner surface 25 of the duct 61, a step 130 of directing the liquid portion 29a towards a slot in the duct 61 and a step 140 of capturing the liquid portion 29a in a sump 64. The step 110 of passing the flow 29 may comprise passing a water/air mixture through a duct of an ECS. The step 120 of directing the liquid portion 29a towards an inner surface 25 of the duct 61 may comprise imparting a centrifugal swirl on the flow 29. The step 120 may comprise passing the flow 29 through a bend 28 in the duct 61 such that inertial forces direct the liquid portion 29a to be thrown toward an outer side 33 of the bend 28 and onto the inner surface 25. The step 130 of directing the liquid portion 29a towards a slot in the duct 61 may comprise running the liquid portion 29a along at least one ridge 63 on the inner surface 25 of the duct 61. The step 140 of capturing the liquid portion 29a in a sump 64 may comprise flowing the liquid portion 29a into a gutter 52 of the sump 64.

As can be appreciated by those skilled in the art, the present invention provides improved liquid extractors. The longitudinal sump configuration allows embodiments of the present invention to be effectively used in envelope constrained applications. The slot and ridge design of the present invention provides liquid extractors that can be used in straight and/or elbow sections of a duct.

It should be understood, of course, that the foregoing relates to exemplary embodiments of the invention and that modifications may be made without departing from the spirit and scope of the invention as set forth in the following claims.

We claim:

1. An apparatus for extracting a liquid portion from a flow comprising:
   a duct adapted to receive said flow;
   at least one slot positioned longitudinally along said duct; and
   at least one ridge positioned on an inner surface of said duct and adapted to direct said liquid portion to said slot.

2. The apparatus of claim 1, wherein said ridge intersects said slot.

3. The apparatus of claim 1, wherein said ridge and a surface of said flow forms a ridge/flow angle between about 10° and about 70°.

4. The apparatus of claim 1, further comprising a sump positioned radially outward from said slot and attached to with said duct.

5. The apparatus of claim 1, further comprising a swirl device positioned upstream from said slot.

6. The apparatus of claim 1, wherein said duct has a bend and said slot is positioned on an outer side of said bend.

7. The apparatus of claim 1, further comprising at least one upstream ridge positioned on said inner surface and upstream from said slot, said upstream ridge having a gap.

8. The apparatus of claim 1, wherein said apparatus comprises at least two slots.

9. The apparatus of claim 8, wherein said two slots are axially aligned.

10. An apparatus for extracting a liquid portion from a flow comprising:
    a duct adapted to receive said flow, said duct having a slot;
    a sump positioned longitudinally along said duct and in flow communication with said slot, said sump adapted to receive said liquid portion; and
    at least one ridge positioned on an inner surface of said duct and intersecting said slot.

11. The apparatus of claim 10, wherein said ridge intersects said slot such that a ridge/slot angle of less than or equal to about 90 degrees is formed.

12. The apparatus of claim 10, wherein said apparatus comprises at least two slots positioned parallel to each other.

13. The apparatus of claim 10, wherein said ridge and a surface of said flow forms a ridge/flow angle of less than about 60°.

14. The apparatus of claim 10, wherein said sump includes a retaining wall wherein a gutter is formed between said retaining wall and an interior surface of said sump.

15. The apparatus of claim 10, wherein said sump includes a drainage orifice.

16. The apparatus of claim 10, wherein said ridge has a radial height of between about 0.050 inches and about 0.100 inches.

17. The apparatus of claim 10, wherein said slot includes at least one keyhole.

18. The apparatus of claim 10, wherein said slot has a slot width of less than about 0.25 inch.

19. An apparatus comprising:
    a duct for receiving a liquid/gas mixture, said duct having a bend;
    a slot positioned on an outer side of said bend and positioned parallel to a duct axis of said duct;
    at least one ridge intersecting said slot; and
    a sump in contact with said duct and designed to enclose said slot, said sump adapted to receive a liquid portion of said liquid/gas mixture.

20. The apparatus of claim 19, wherein said sump is in flow communication with a drain boss.

21. The apparatus of claim 19, wherein said apparatus comprises at least two ridges positioned parallel to each other.

22. The apparatus of claim 19, further comprising at least one upstream ridge positioned upstream from said slot.

23. The apparatus of claim 19, wherein said duct is an environmental control system duct and said liquid/gas mixture comprises a water/air mixture.

24. The apparatus of claim 19, wherein said ridge and said slot form a ridge/slot angle of less than about 90°.

* * * * *